May 3, 1966  J. F. BUTLER ETAL  3,248,968
VIBRATION REDUCING DEVICES
Filed Nov. 15, 1962  2 Sheets-Sheet 1
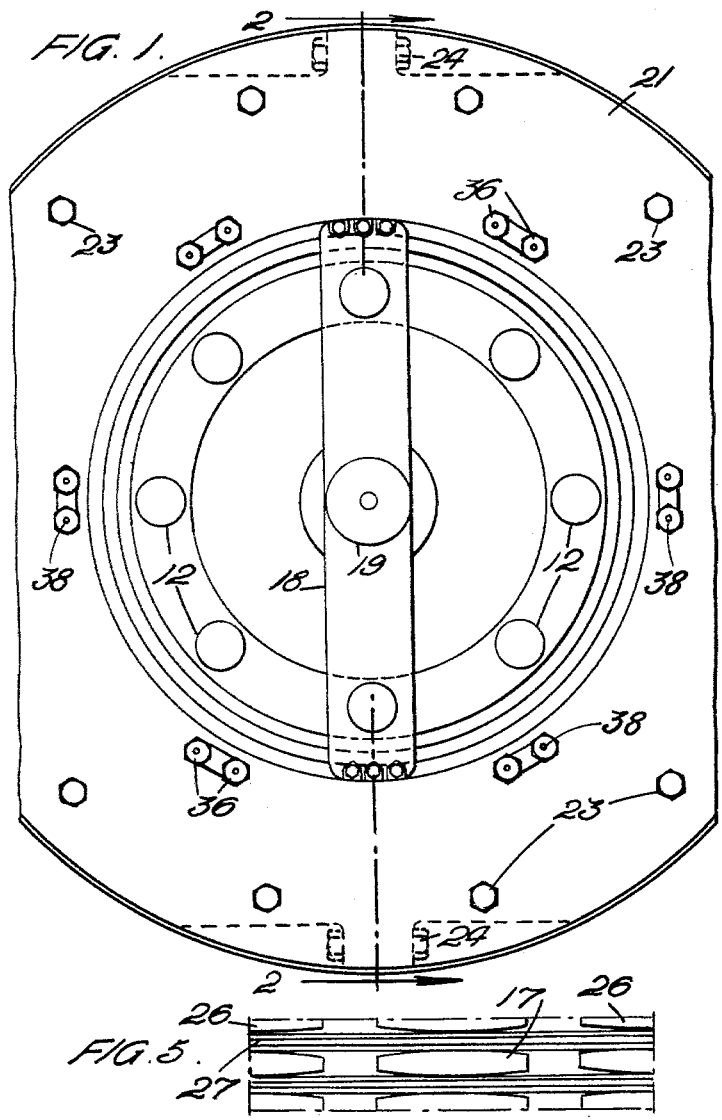
Inventors
John Francis Butler &
Finn Ørbeck
their Attorneys May 3, 1966  J. F. BUTLER ETAL  3,248,968
VIBRATION REDUCING DEVICES
Filed Nov. 15, 1962  2 Sheets-Sheet 2
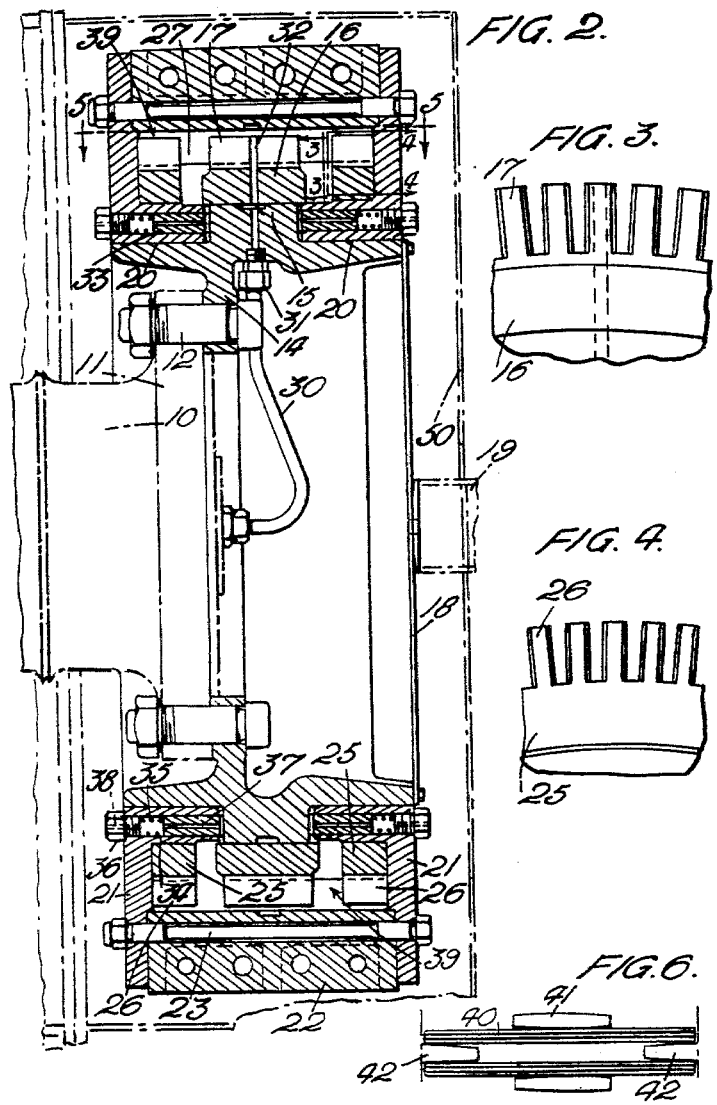
Inventors
John Francis Butler &
Finn Ørbeck

United States Patent Office 3,248,968
Patented May 3, 1966

3,248,968
VIBRATION REDUCING DEVICES
John Francis Butler and Finn Ørbeck, Sunderland, Durham, England, assignors to William Doxford & Sons (Engineers) Limited, Sunderland, Durham, England, a British company
Filed Nov. 15, 1962, Ser. No. 237,893
Claims priority, application Great Britain, Nov. 16, 1961, 41,055/61
7 Claims. (Cl. 74—574)

The invention relates to vibration reducing devices and in particular to devices for reducing vibration stresses in rotating shafts.

In machinery employing a rotating shaft for the transmission of power uneven torque production in the driving means or uneven torque absorption in the driven means may, at certain speeds of rotation of the shaft, result in excessive stresses in the shafting due to resonance between the torque impulses and the natural frequency of torsional vibrations of the shafting system.

The present invention is concerned with reducing such vibrations.

The invention provides a device for reducing torsional vibrations in a rotating shaft and comprising a floating mass rotatable about the shaft axis and resilient driving means connecting the floating mass and shaft members comprising at least one axially extending leaf spring in combination with two abutments on one of the members facing circumferentially in one direction and engaging one face of the leaf and an abutment on the other of the members facing circumferentially in the other direction and engaging the opposite face of the leaf at a location between the two abutments aforesaid whereby relative rotation of the members in one sense effects flexing of the leaf as a beam supported at its ends.

Preferably there are abutments as aforesaid at each face of the leaf spring whereby the spring is flexed as aforesaid on relative rotation of the two members in either sense. Multi-leaf springs may be employed.

The abutments may, for example, be provided by the sides of axially extending grooves or slots in the members and the spring be received within the grooves or slots.

It is also preferred that there are a multiplicity of leaves and abutments as aforesaid around the shaft.

In one form of the invention the spring and abutments extend axially of the shaft and the spring abutting face of at least one of the abutments abutting the faces of the or each spring is convexly curved so that as the spring is flexed about the convex abutment face the length of the spring abutting the abutment increases to reduce the effective non-engaged or free length of the spring between abutments and to increase the resistance of the spring to the said relative movement.

Preferably the abutments and the leaf spring or springs are enclosed and the enclosure contains a liquid serving to damp relative movements of the members. There may be means for circulating liquid through the enclosure.

Where rotating shafts are used for the transmission of power there may be axial vibrations of the shafting system in addition to the torsional vibrations already mentioned.

To reduce axial vibrations of the shafting system there may, according to a feature of the present invention, be limited clearance for relative axial movement of the fixed and floating members and spring and/or damping means between the two members to restrain or resist such axial movement.

Such spring means may be in the form of coil springs between the two members.

Hydraulic damping means may be used.

For example the coil springs may be enclosed in cylinders on one member and there may be plungers working in the cylinders and acting between the springs and the other member the cylinders containing fluid and there being restricted passages leading from the cylinders whereby movement of the plungers within the cylinders causes energy to be dissipated as fluid is forced into and out of the cylinders through the passages.

A specific device for reducing vibration stresses in shafting and according to the invention and a modification thereof will now be described with reference to the accompanying drawings in which:

FIGURE 1 is an end view of the device,
FIGURE 2 is a section on the line 2—2 in FIGURE 1,
FIGURE 3 is a scrap view on the line 3—3 in FIGURE 2,
FIGURE 4 is a scrap view on the line 4—4 in FIGURE 2,
FIGURE 5 is a scrap development on the line 5—5 in FIGURE 2 and
FIGURE 6 is a scrap development similar to FIGURE 5 but showing the modification.

A driving shaft 10 has a flange 11 to which is attached by bolts 12 a generally cylindrical member 14. There is an external rib 15 around the member 14 and on to the rib 15 is shrunk a wheel 16 having one hundred and twenty teeth or abutments 17 projecting around its circumference. The teeth 17 are shown in detail in FIGURES 3 and 5.

The front end of the member 14 carries a support channel 18 and a pulley 19.

The circumferential surface of the cylindrical member 14 on either side of the rib 15 provides two bearing surfaces 20 and there are two floating rims 21 which are rotatable on the bearing surfaces.

The two rims 21 are joined together and to a two-part cover 22 by coupling bolts 23. The two halves of the cover 22 are fixed together by bolts 24. Each of the floating rims 21 carries a floating wheel 25 which is shrunk on to the rim, and each wheel 25 carries one hundred and twenty teeth or abutments 26 which correspond to the teeth 17. The teeth 26 are shown in detail in FIGURES 4 and 5.

The rims 21, the wheels 25 and the cover 22 form a floating member which is rotatable relative to the cylindrical member 14 and the associated wheel 16 which are fixed relative to the shaft 10.

As can be seen from FIGURE 5 flat leaf springs 27, each comprising three leaves are interposed between the teeth 26 and the teeth 17. The springs 27 provide resistance to the relative rotation of the said floating member and a fixed member comprising the parts fixed relative to the shaft 10.

It will be seen from FIGURE 5 that as relative movement between the two members increases so does the resistance provided by the springs. This is due, in addition to the properties of the springs themselves, to the convex curvature on the faces of the teeth whereby as the springs bend their effective length shortens.

When the shaft is rotating, in use, and torque impulses are applied to the shaft resonance between the torque impulses and the natural frequency of torque vibrations of the shafting system at the speed of rotation may cause excessive torsional stresses in the shafting.

When the device described is fitted to the shafting any torque impulse will cause the floating member to rotate relative to the fixed member because of the inertia of the floating member thereby tending to smooth out vibrations. In addition some of the vibrational energy is absorbed in overcoming the friction of the springs and by the damping effect of the oil between the moving parts.

Lubricant is fed from the shaft 10 through a pipe 30 and a union 31 to a drilling 32 in the shaft member and hence to the chamber 39 formed between the two members. The lubricant serves further to damp any resonance.

There is provision for limited axial movement between the fixed and floating members and resistance to such axial movement is provided by twelve pairs of plungers 33 spaced apart around the members and bearing on the rib 15.

Each plunger 33 is housed in a hole 34 in one of the rims 21 on the floating member and is held in engagement with the rib 15 by a spring 35 and a screw 36. Each plunger 33 and screw 36 has a restricted throughway 37, 38 respectively and lubricant passes through the two throughways from the chamber 39.

When the shafting system is subjected to axial vibrations the shaft and floating members tend to move relatively axially of the shaft 10 due to the inertia of the floating members. Such axial movement is opposed by the plungers 33, the springs 35 and by the lubricant passing out of the holes 34 through the restricted throughways 37, 38. In this way axial vibrations are effectively reduced.

The device is contained in a housing 50.

FIGURE 6 shows a modification of the device in which springs 40 are arranged between teeth 41, 42 on the shaft and floating members respectively. The springs in this example are initially in a bent state as the width of the teeth 42 is greater than the width between the springs 40 in contact with the teeth 41, so that the device is preloaded.

Although the description so far has referred to the fixed or shaft member as that one having one set of teeth and to the floating member as that having two such sets, one on either side of that on the shaft member, it is clear that the member having two sets could be rigidly attached to the driving shaft and that having only one set of teeth be free to have a limited relative rotation. Thus the functions of the two members would be interchanged but the device as a whole would still act to reduce vibration stresses in the shafting system in the manner previously described.

It is also to be understood that the projections or teeth need not extend around the whole circumference of each member. For example there may be two groups of teeth and associated springs at diametrically opposed portions of the members.

The device described is particularly suitable for use in a large marine diesel engine and in such use the driving shaft 10 would be the front end of the crankshaft of the diesel engine.

We claim:

1. A device for reducing torsional vibrations in a shaft mounted for rotation about its axis, said device comprising a floating mass mounted for rotation about the shaft axis, a resilient driving connection between the mass and the shaft, said connection including a pair of axially spaced rings of abutments on one of said shaft and said mass and a third ring of abutments on the other of said shaft and said mass disposed between said spaced rings, the abutments on said outer rings being aligned with one another and with grooves disposed respectively between abutments on said third ring, spring means mounted in each of said grooves in engagement with said third ring abutments and protruding axially therefrom into engagement with said aligned abutments respectively, said abutments being disposed to prestress said spring means, and the spring engaging faces of the abutments on at least one of said rings being convexly curved generally in the direction of the length of said spring meanss so that relative movement of the abutments in a direction to deflect said spring means reduces the effective length of said spring means.

2. A device for reducing torsional vibrations in a shaft mounted for rotation about the axis thereof, said device comprising a floating mass mounted for rotation about said shaft axis, resilient driving connection between the mass and the shaft, said connection comprising two spaced abutments on one of said shaft and said mass facing in one direction circumferentially of the shaft, a third abutment disposed intermediately of said spaced abutments on the other of said shaft and said mass, said abutment facing in the other direction circumferentially of the shaft, a leaf spring extending axially of the shaft, one face of the spring engaging said spaced abutments and the other face of the spring engaging said third abutment in the length of the spring between said spaced abutments, the faces of said spaced abutments contacting the spring being convexly curved so that upon relative movement of the abutments in a direction to deflect said spring the points of engagement of said spring with said spaced abutments move toward said third abutment to reduce the effective length of the spring, and an enclosure around the abutments and the leaf spring, said enclosure containing a liquid serving to damp relative movements of said shaft and said mass.

3. A device as claimed in claim 2 in which means are provided for circulating liquid through the enclosure.

4. A device for reducing torsional vibrations in a shaft mounted for rotation about the axis thereof, said device comprising a floating mass mounted for rotation about said shaft axis, resilient driving connection between the mass and the shaft, said connection comprising two spaced abutments on one of said shaft and said mass facing in one direction circumferentially of the shaft, a third abutment disposed intermediately of said spaced abutments on the other of said shaft and said mass, said third abutment facing in the other direction circumferentially of the shaft, a leaf spring extending axially of the shaft, one face of the spring engaging said spaced abutments and the other face of the spring engaging said third abutment in the length of the spring between said spaced abutments, the faces of said spaced abutments contacting the spring being convexly curved so that upon relative movement of the abutments in a direction to deflect said spring the points of engagement of said spring with said spaced abutments move toward said third abutment to reduce the effective length of the spring, said shaft and said mass being spaced to provide clearance for relative axial movement therebetween, and damping means coupled between said shaft and said mass to restrain said axial movement and to reduce axial vibrations of said shaft.

5. A device as claimed in claim 4 in which the damping means is in the form of coil springs acting in the axial drection between the shaft and the mass.

6. A device as claimed in claim 4 in which the damping means is hydraulic.

7. A device as claimed in claim 4 in which the axial damping means includes coil springs which are enclosed in cylinders in one of the shaft and the mass and plungers working within the cylinders and acting between the springs and the other of the shaft and the mass, the cylinders containing fluid and there being restricted passages leading from the cylinders whereby relative axial movement of the shaft and the mass causes energy to be dissipated as the plungers force fluid out of the cylinders through the passages.

(References on following page)

References Cited by the Examiner

UNITED STATES PATENTS

| | | | |
|---|---|---|---|
| 1,272,061 | 7/1918 | Lake | 74—574 |
| 1,929,106 | 10/1933 | Van Degrift et al. | 74—574 |
| 2,012,939 | 9/1935 | Bibby | 74—574 |
| 2,028,903 | 1/1936 | Griswold | 74—574 |
| 2,029,516 | 2/1936 | Tower | 74—574 |
| 2,207,376 | 7/1940 | Gaubatz | 74—574 |

FOREIGN PATENTS 508,513  7/1939  Great Britain.

MILTON KAUFMAN, *Primary Examiner.*
BROUGHTON G. DURHAM, *Examiner.*
T. W. SHEAR, *Assistant Examiner.*